(12) United States Patent
Otsuka

(10) Patent No.: US 10,620,899 B2
(45) Date of Patent: Apr. 14, 2020

(54) VIDEO DISPLAY DEVICE AND VIDEO DATA TRANSMISSION METHOD

(71) Applicant: MITSUBISHI ELECTRIC CORPORATION, Chiyoda-ku, Tokyo (JP)

(72) Inventor: Shoji Otsuka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/072,377

(22) PCT Filed: Aug. 24, 2016

(86) PCT No.: PCT/JP2016/074704
§ 371 (c)(1),
(2) Date: Jul. 24, 2018

(87) PCT Pub. No.: WO2017/138171
PCT Pub. Date: Aug. 17, 2017

(65) Prior Publication Data
US 2019/0056903 A1     Feb. 21, 2019

(30) Foreign Application Priority Data
Feb. 9, 2016    (JP) ................. 2016-022955

(51) Int. Cl.
*G09G 5/36*     (2006.01)
*G06F 3/14*     (2006.01)
(Continued)

(52) U.S. Cl.
CPC ............ *G06F 3/1446* (2013.01); *G09G 5/00* (2013.01); *G09G 5/006* (2013.01); *G09G 5/395* (2013.01);
(Continued)

(58) Field of Classification Search
CPC .... G09G 5/393; G09G 5/399; G09G 2360/18; G09G 2310/04; G09G 2360/12; G09G 3/2092; G06T 1/60
See application file for complete search history.

(56) References Cited

U.S. PATENT DOCUMENTS

| | | | |
|---|---|---|---|
| 5,343,225 A | 8/1994 | Yamaguchi | |
| 2001/0022587 A1* | 9/2001 | Ono | ........ G06F 3/1438 345/532 |
| 2011/0249192 A1* | 10/2011 | Shamarao | ........ G09G 5/001 348/725 |

FOREIGN PATENT DOCUMENTS

| | | |
|---|---|---|
| JP | 62288980 A | 12/1987 |
| JP | 04005685 A | 1/1992 |

(Continued)

OTHER PUBLICATIONS

International Search Report (PCT/ISA/210) dated Oct. 25, 2016, by the Japanese Patent Office as the International Searching Authority for International Application No. PCT/JP2016/074704.

*Primary Examiner* — Hau H Nguyen
(74) *Attorney, Agent, or Firm* — Buchanan Ingersoll & Rooney PC

(57) ABSTRACT

A display includes eight modules. A relay group includes eight relays provided for the respective modules. Each relay includes: a buffer; a memory writer for writing video data into the buffer; and a memory reader that, after the memory writer completes writing, reads the video data from the buffer at a speed lower than a speed of the writing and outputs the read video data to the corresponding module. A video data supplier sequentially sorts the video data to the eight relays in such a manner that, per line of line data, the line data from the buffer of one relay of the eight relays is read during a writing period of the line data to buffers of the other seven relays.

6 Claims, 12 Drawing Sheets

(51) Int. Cl.
 G09G 5/00  (2006.01)
 G09G 5/399 (2006.01)
 G09G 5/397 (2006.01)
 G09G 5/395 (2006.01)
 H04N 7/10  (2006.01)

(52) U.S. Cl.
 CPC ............ G09G 5/397 (2013.01); G09G 5/399 (2013.01); H04N 7/104 (2013.01); *G09G 2320/0247* (2013.01)

(56) References Cited

FOREIGN PATENT DOCUMENTS

| | | |
|---|---|---|
| JP | 05110785 A | 4/1993 |
| JP | 05232898 A | 9/1993 |
| JP | 06027932 A | 2/1994 |
| JP | 2001109442 A | 4/2001 |
| JP | 2004056614 A | 2/2004 |

* cited by examiner

VIDEO DISPLAY DEVICE AND VIDEO DATA TRANSMISSION METHOD

TECHNICAL FIELD

The present disclosure relates to a video display device and a video data transmission method.

BACKGROUND ART

A video display device in which a display includes a plurality of modules is known. For example, a display of a large video display device to be installed on a wall surface of an athletic stadium or a building is constructed by coupling a plurality of modules in order to facilitate manufacture of the display.

Patent Literature 1 discloses a configuration in which such a video display device transmits portions of video data of one frame to corresponding modules, each portion of the video data being for one module of the modules. Each of the modules displays an image corresponding to the video data transmitted thereto.

Patent Literature 2 discloses a configuration in which two buffers each having a storage capacity for one line are interposed between a memory that stores image data and an output destination of the image data. The image data is alternately written in the two buffers for each line, and the image data is read out from the buffer not being written.

CITATION LIST

Patent Literature

Patent Literature 1: Unexamined Japanese Patent Application Kokai Publication No. 2004-56614
Patent Literature 2: Unexamined Japanese Patent Application Kokai Publication No. H05-110785

SUMMARY OF INVENTION

Technical Problem

In the video display device, it is desirable to transmit the video data to each module at a transmission rate as low as possible while maintaining the frame rate. This is because the faster a transmission rate of the video data is, the transmission cable compatible with high speed transmission is necessary, the faster a high speed transmission cable must be to handle the transmission rate, and this leads to thicker and bulkier cables that cause higher power consumption.

In the process of research, the inventors of the present disclosure conceived of a configuration in which a buffer is provided on the transmission path of the video data leading to each module, and a transmission rate of the video data is reduced by reading the video data from the buffer at a speed lower than a writing speed of the video data to the buffer.

However, in the case where this configuration is applied to the video display device of Patent Literature 1, it is necessary to prepare large-capacity buffers capable of storing the video data for one module equal in number to the number of modules. For this reason, the configuration increases in size.

Patent Literature 2 technique uses a small-capacity buffer. Thus, an increase in size of the configuration can be suppressed. However, if writing into two buffers is alternately performed and reading is to be performed at a speed slower than the writing speed from an unwritten buffer, a period of time occurs in which it is necessary to interrupt the writing into both of the buffers and wait for the completion of reading from one of the buffers. As the result, a frame rate decreases and the display flickers.

An objective of the present disclosure is to provide a video display device and a video data transmission method capable of reducing the transmission rate of the video data to each module while maintaining the frame rate using a configuration whose size is suppressed.

Solution to Problem

In order to attain the aforementioned objective, a video display device according to the present disclosure includes:
a display comprising at least three modules, each of the modules displaying an image corresponding to video data input from an outside of the video display device;
a relay group disposed on a transmission path of the video data leading to the display, the relay group causing reduction in a transmission rate of the video data; and
a video data supplier to supply the video data to the relay group,
wherein
the relay group comprises at least three relays that are provided for the respective modules,
each of the relays comprises
a plurality of partial buffers to store the video data,
a memory writer to write to each of the partial buffers division data that is the video data for less than one module within one frame, supplied from the video data supplier and to switch, every time the division data is provided from the video data supplier, a partial buffer on which writing is performed among the partial buffers, and
a memory reader that, after the memory writer completes the writing, reads the division data from the partial buffer at a speed lower than a speed of the writing and outputs the read division data to the corresponding module, and has a reading period for reading the division data from one partial buffer of the partial buffers, the reading period having an overlap with a writing period for writing the division data to another partial buffer of the partial buffers, and
the video data supplier sequentially sorts the video data into the relays on a multi-division data basis such that reading of the division data from the partial buffer in one relay of the relays is performed during a writing period for writing the division data to the partial buffers of remaining relays of the relays.

Advantageous Effects of Invention

The memory reader reads the video data from the partial buffer at a speed lower than the writing speed of the memory writer. Therefore, the transmission rate of the video data to each module can be reduced.

In addition, the reading of the division data from a partial buffer in one relay is performed in the writing period of the division data to the partial buffers in the other relays. Thus, occurrence of a period can be avoided in which it is necessary to interrupt the writing into each partial buffer and wait for the completion of reading from a certain partial buffer. As the result, a frame rate can be maintained that matches the transmission rate of the division data from the video data supplier up to the relay group.

In addition, as each partial buffer is only required to have a storage capacity sufficient for storing the division data for less than one module, an increase in the size of the configuration can be suppressed.

DESCRIPTION OF EMBODIMENTS

Figure 1:
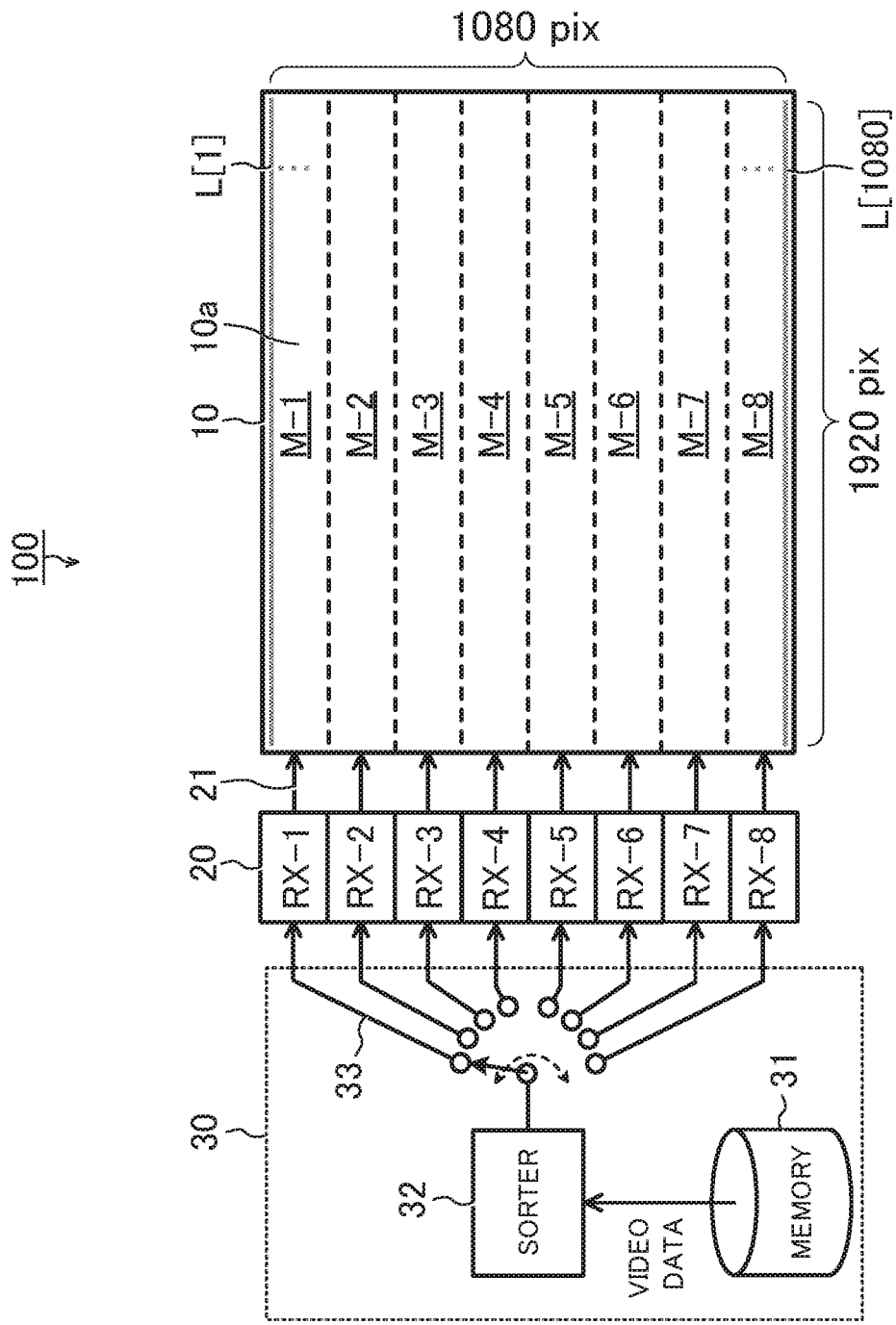
FIG. 1 is a conceptual diagram illustrating a configuration of a video display device according to Embodiment 1.

Hereinafter, a video display device according to an embodiment of the present disclosure is described with reference to the drawings. In the drawings, components that are the same or equivalent are assigned the same reference signs.

Embodiment 1

As illustrated in FIG. 1, the video display device 100 according to the present embodiment includes a display 10 for displaying an image corresponding to the video data input to the video display device 100, a relay group 20 that is arranged on a transmission path of the video data leading to the display 10 and reduces a transmission rate of the video data, and a video data supplier 30 that supplies the video data to the relay group 20.

The display 10 has a rectangular display area 10a whose longitudinal direction is the lateral direction in a front view. The display area 10a is formed of pixels arranged in a matrix of 1080 pixels in height×1920 pixels in width. The area of the display area 10a is 10 m2 or more.

A partial area formed of pixels arranged in one horizontal row of the display area 10a is referred to as a line. L [1] through L [1080] are assigned to 1080 lines forming the display area 10a from the uppermost portion to the lowermost portion in the longitudinal direction as viewed from the front.

The display 10 has a structure divided into eight portions in the longitudinal direction. Specifically, the display 10 has a structure in which first through eighth modules M-1 through M-8, each of which is long in the lateral direction as viewed from the front, are connected in a height direction as a short direction that is orthogonal to the above-mentioned longitudinal direction. Each of the first through eighth modules M-1 through M-8 displays an image corresponding to the video data input from the outside of the display 10.

Each of the first through eighth modules M-1 through M-8 is in charge of displaying an image in a partial area of 135 (=1080/8) lines in the display area 10a, that is, longitudinal 135 pixels×horizontal 1920 pixels.

In the following explanation, i is a variable representing any integer from 1 to 8.

Figure 2:
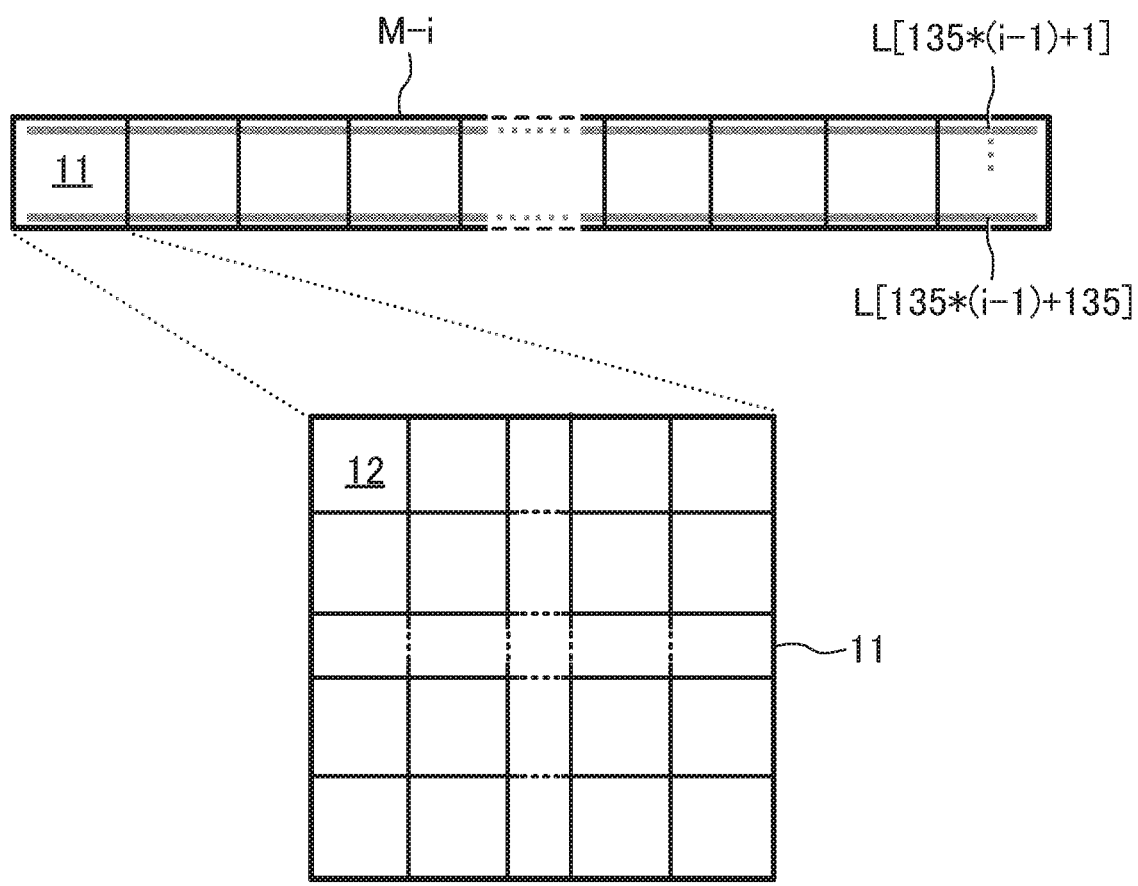
FIG. 2 is a conceptual diagram of a module constituting a display according to Embodiment 1.

As illustrated in FIG. 2, specifically, the i-th module M-i displays an image in a line L [135*(i−1)+1] through a line L [135*(i−1)+135]. Here, "*" is a symbol representing multiplication.

In addition, the i-th module M-i has a structure in which a plurality of display units 11 are arranged in the lateral direction. Each of the display units 11 has a structure in which the light emitting elements 12 are arranged lengthwise and crosswise in a matrix. Each of the light emitting elements 12 has a structure in which a red light emitting diode (LED), a blue LED, and a green LED are mounted in a common package.

One light emitting element 12 forms one pixel. Specifically, one display unit 11 is formed of 64 vertical×64 horizontal light-emitting elements 12. The i-th module M-i includes 30 (=1920/64) display units 11 arranged in the lateral direction.

Next, returning to FIG. 1, the relay group 20 is described. The relay group 20 includes first through eighth relays RX-1 through RX-8. The i-th relay RX-i is provided corresponding to the i-th module M-i.

That is, the i-th relay RX-i is arranged on the transmission path of the video data leading to the i-th module M-i. The i-th relay RX-i reduces the transmission rate of the video data transmitted to the i-th module M-i. The i-th relay RX-i includes a transmission cable 21 for transmitting the video data to the i-th module M-i.

Figure 3:
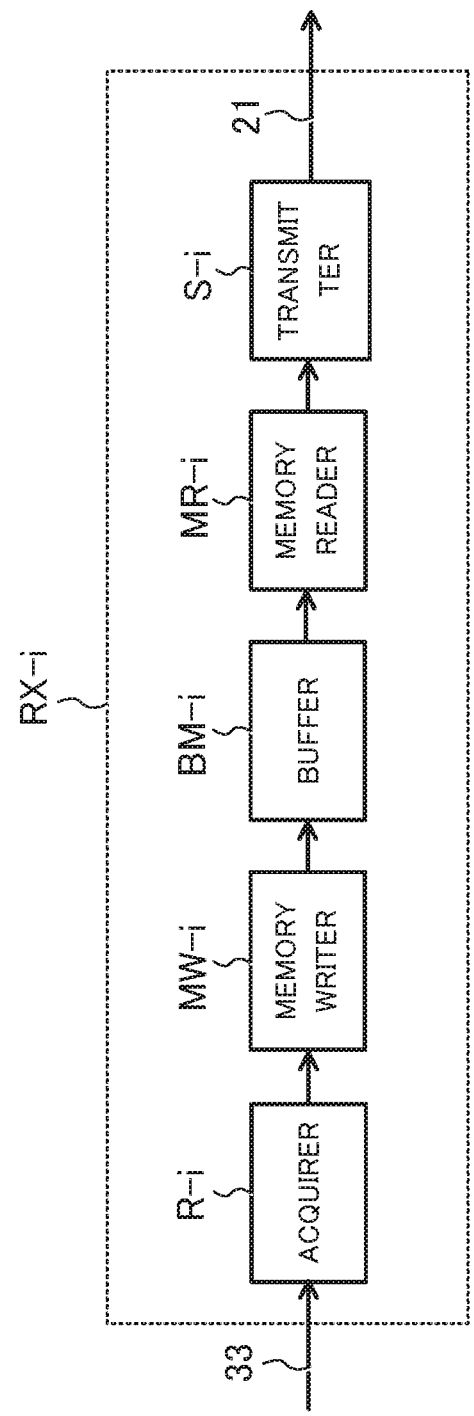
FIG. 3 is a block diagram illustrating a configuration of a relay according to Embodiment 1.

As illustrated in FIG. 3, the i-th relay RX-i has an acquirer R-i that acquires video data through a transmission cable 33, a buffer BM-i that stores the video data, a memory writer MW-i that writes the video data acquired by the acquirer R-i, a memory reader MW-i that reads the video data from the buffer BM-i when writing by the memory writer MW-i is completed and then outputs the read video data, and a transmitter S-i that transmits the video data output by the memory reader MR-i to the i-th module M-i through the transmission cable 21.

In order to lower the transmission rate of the video data to the i-th module M-i, the memory reader MR-i reads the video data from the buffer BM-i at a speed lower than the writing speed of the video data by the memory writer MW-i. The buffer BM-i has a FIFO (First In First Out) structure. The memory reader MR-i first reads the video data previously written to the buffer BM-i.

The buffer BM-i has a capacity capable of storing one line of the video data (hereinafter referred to as line data) as division data that is less than the i-th module M-i of one frame. That is, the acquirer R-i acquires the line data through the transmission cable 33, the memory writer MW-i writes the line data, and the memory reader MR-i reads the line data.

Next, returning to FIG. 1, the video data supplier 30 is described. The video data supplier 30 includes a memory 31 in which the video data of a plurality of frames are stored in advance, a sorter 32 that reads the video data from the memory 31 and sequentially sorts the read video data to the first to the eighth relays RX-1 through RX-8 for each single line data, and the transmission cable 33 through which the line data sorted to the i-th relay RX-i by the sorter 32 is transmitted.

A frame rate of an image to be displayed on the display 10 is determined by the speed at which the sorter 32 reads the video data from the memory 31. The speed at which the video data is read from the memory 31 is equal to the speed at which the video data is transmitted from the sorter 32 to the relay group 20. In this specification, the speed refers to the information amount [bit] per unit time.

The sorter 32 acquires the video data from the memory 31 by serial communication. That is, the sorter 32 sequentially reads the video data from the memory 31 one bit at a time. On the other hand, the relay group 20 concurrently supplies the serially formatted video data to the plurality of modules of the display 10. Therefore, even if the transmission rate of the video data is lowered in the relay group 20, a frame rate can be maintained that matches the reading and transmission rate of the video data by the sorter 32.

Hereinafter, with reference to FIGS. 4 to 6, operations of each component is specifically described when transmitting the video data from the video data supply device 30 to the display 10.

Figure 4:
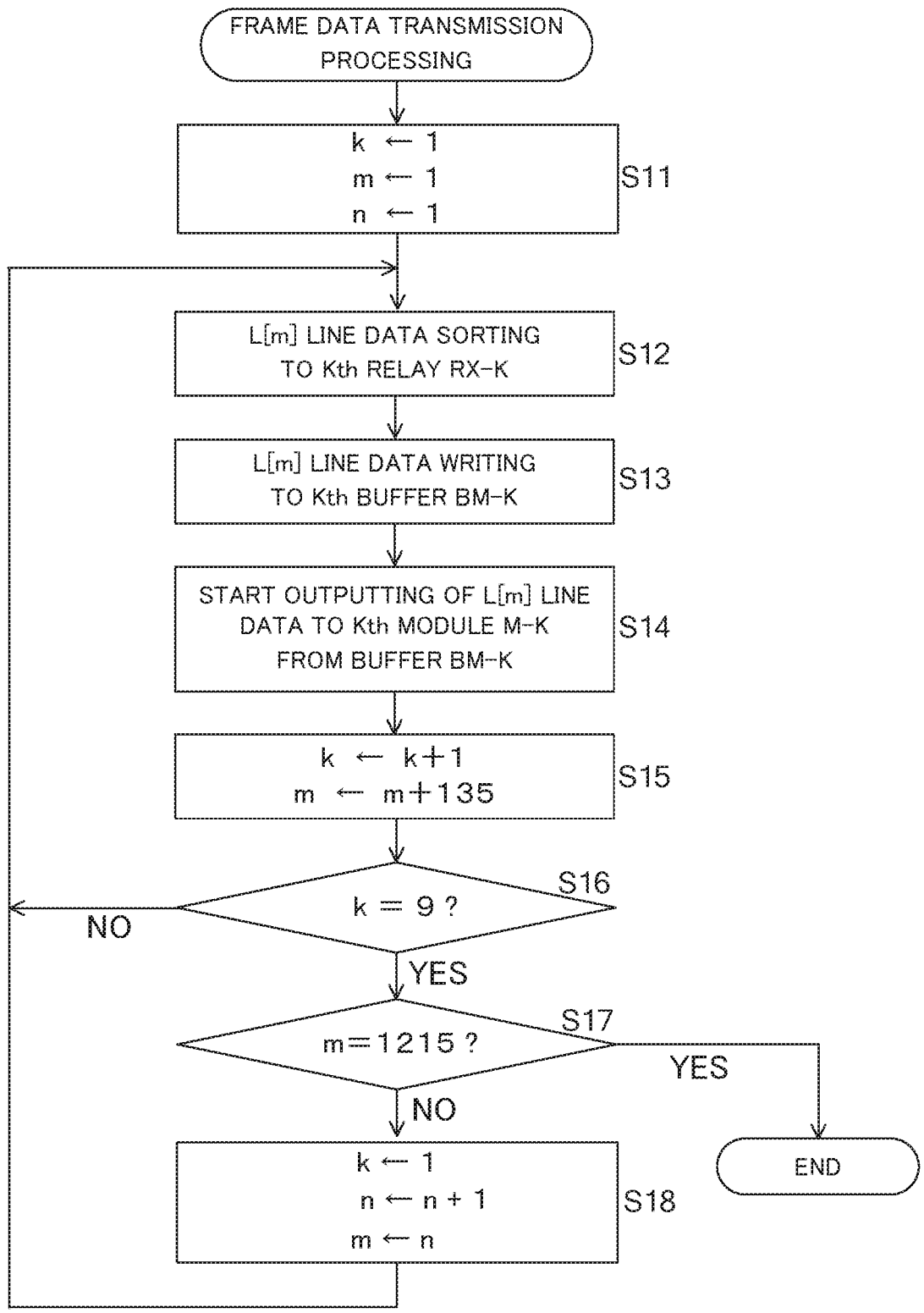
FIG. 4 is a flowchart of frame data transmission processing according to Embodiment 1.

Referring first to FIG. 4, the entire flow of the frame data transmission processing is described, in which the video data of one frame is transmitted from the video data supplier 30 to the display 10.

Integer type variables k, m, and n are assumed to be substituted with a value of 1 (step S11).

First, the sorter 32 starts transmission of the line data (hereinafter referred to as L [m] line data) representing an image to be displayed on the line L [m] to the kth relay RX-k (step S12).

In the kth relay RX-k, while the acquirer R-k acquires the L [m] line data from the sorter 32, the acquirer R-k outputs the acquired L [m] line data to the memory writer MW-k. The memory writer MW-k writes the acquired L [m] line data to the buffer BM-k while acquiring the L [m] line data from the acquirer R-k (step S13).

Next, when the writing by the memory writer MW-k is completed, the memory reader MR-k starts reading the L [m] line data from the buffer BM-k at a speed of 1/7 of the writing speed of the memory writer MW-k. That is, the memory reader MR-k starts outputting the L [m] line data to the k-th module M-k at a speed of 1/7 of the transmission rate of the video data from the sorter 32 to the acquirer R-k (Step S14).

The reading speed of the memory reader MR-k is lower than the writing speed of the memory writer MW-k. Thus, it takes longer time for the memory reader MR-k to perform reading than for the memory writer MW-k to perform writing. The sorter 32 proceeds to the processing of step S15 and subsequent steps without waiting for completion of reading by the memory reader MR-k.

Next, the sorter 32 increases the value of k by 1 and increases the value of m by 135 (step S15).

Next, the sorter 32 determines whether k=9 (step S16). If k≠9 (No in step S16), the processing returns to step S12.

Conversely, if k=9 (YES in step S16), the sorter 32 determines whether m=1215 (step S17). If m≠1215 (NO in step S17), the sorter 32 resets k to 1, n is incremented by 1, then m is substituted with a value of n (step S18), and the process returns to step S12.

Conversely, if m=1215 (step S17: YES) in step S17, the sorter 32 terminates the present processing. Because m=1215 in step S17 indicates that the output of the line data for L [1080] to the eighth module M-8 is already started.

As mentioned above, FIG. 4 shows the flow of the processing of transmitting the video data for one frame. The process illustrated in FIG. 4 is repeated each time the video data of one frame is transmitted from the video data supplier 30 to the display 10.

Figure 5:
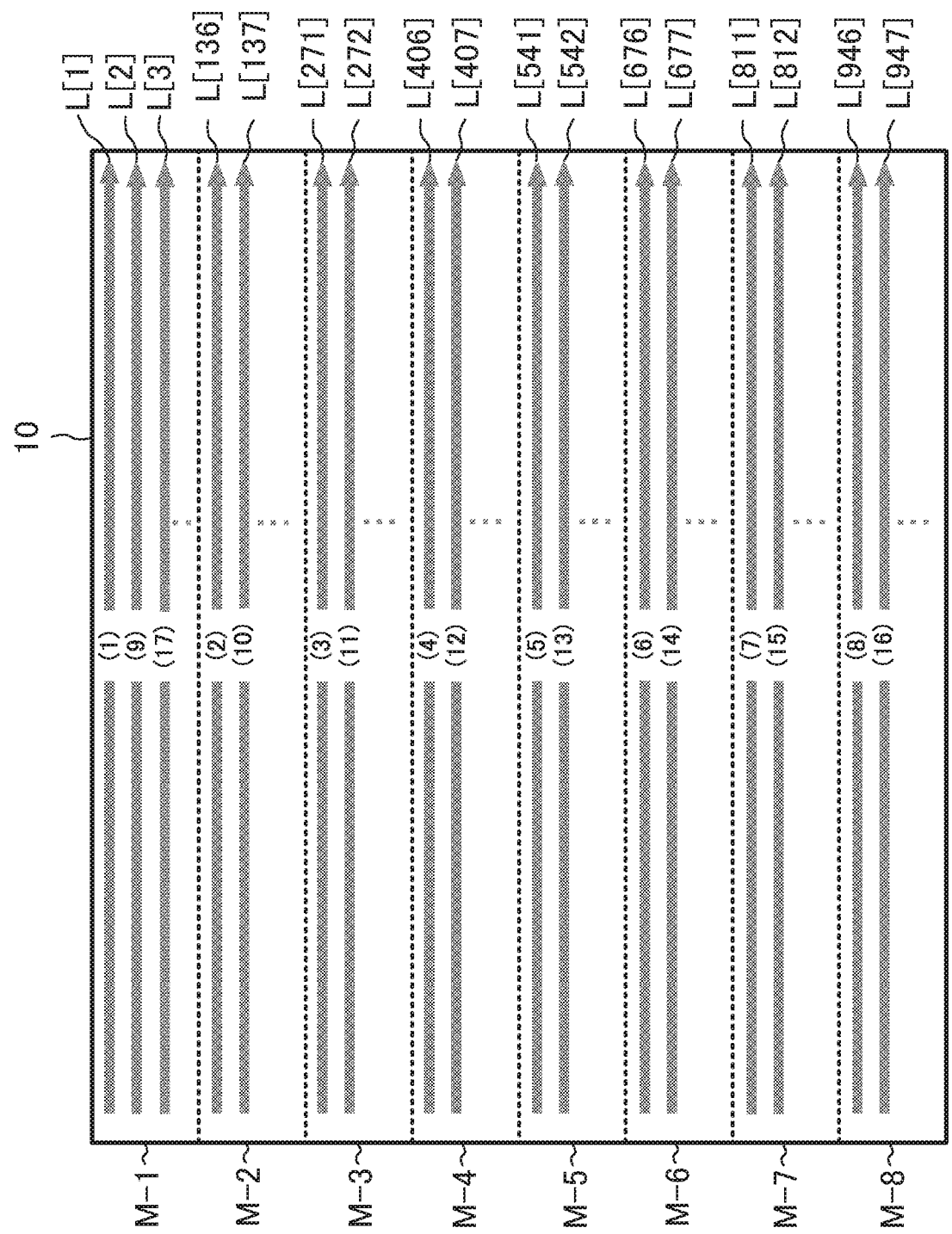
FIG. 5 is a conceptual diagram illustrating an order of line data sorting according to Embodiment 1.

Next, with reference to FIG. 5, the order of input of 1080 lines of line data representing an image of one frame to the display 10 is specifically described. Numbers in the parentheses such as (1) through (16) in FIG. 5 indicate the input order of the line data to the display 10.

First, as indicated by the number (1), line data for L [1] is input to the first module M-1. This is achieved by the processing of step S14 of FIG. 4 in the first loop when k=1 and m=1.

Next, as indicated by the number (2), line data for L [136] is input to the second module M-2. This is achieved by the processing of step S14 of FIG. 4 in the second loop in the case of k=2 and m=136.

Next, as indicated by the number (3), line data for L [271] is input to the third module M-3. This is achieved by the processing of step S14 of FIG. 4 in the third round in the case of k=3 and m=271.

In this way, the line data is input in the order of the numbers (1), (2), (3) through (16) and beyond. This is achieved by the sorter 32 sequentially and periodically sorting the line data to the first through eighth relays RX-1 through RX-8 such that the line data is provided to the i-th relay RX-i in order according to the line number.

Here, the meaning that the line data is provided in order according to the line number is that, after the line data corresponding to a certain line L [j] is provided, the line data corresponding to the line L [j+1] thereunder is provided.

FIG. 5 is a conceptual diagram illustrating the order of input of the line data to the display 10 and does not show the order of display switching on the display 10. The display 10 can concurrently switch the display when the input of the video data of one frame to the first to the eighth modules M-1 through M-8 is completed.

Figure 6:
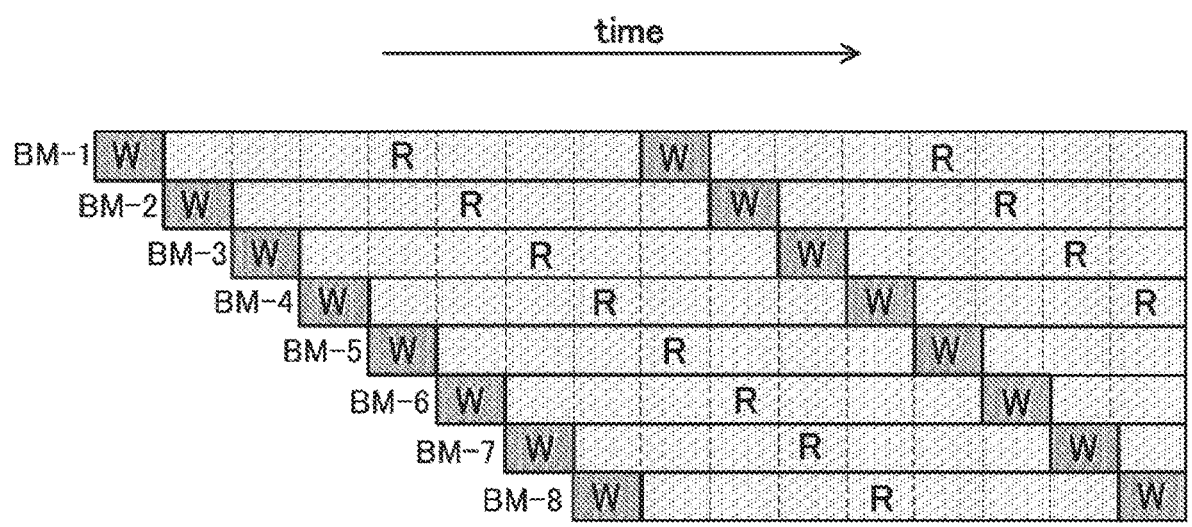
FIG. 6 is a timing chart of an operation of a memory writer and a memory reader according to Embodiment 1.

With reference to FIG. 6, next, write and read timings for buffers BM-1 through BM-8 are described.

In FIG. 6, W represents a writing period of the line data to the buffer BM-i by the memory writer MW-i. As the sorter 32 sequentially sorts the line data to the first through eighth relays RX-1 through RX-8, writing to the buffers BM-1 through BM-8 is sequentially and periodically performed.

More specifically, in the first cycle, writings of the line data are sequentially performed in the order of: the line data for L [1] to the buffer BM-1, the line data for L [136] to the buffer BM-2, . . . and the line data for L [946] to the buffer BM-8.

In this manner, when writing to the buffer BM-i is performed, writing to the buffer BM-mod (i+1, 8) is performed. Here, mod (n, 8) represents n when n≤8, and when n>8, mod (n, 8) is a function representing a remainder obtained by dividing n by 8.

In FIG. 6, R represents a reading period of the line data from the buffer BM-i by the memory reader MR-i. In the i-th relay RX-i, when the writing by the memory writer MW-i is completed, reading by the memory reader MR-i starts. The reason why the reading period of the memory reader MR-i is longer than the writing period of the memory writer MW-i is because the transmission rate of the line data to the i-th module M-i is reduced to 1/7 as described above.

Reading of the line data from the buffer BM-i is performed in parallel with writing of the line data to each of the other buffers BM-j (j is any natural number from 1 to 8 except when j=i).

Specifically, during the read period of the line data for L [1] from the buffer BM-1, the line data for L [136] is written to the buffer BM-2, the line data for L [271] is written to the buffer BM-3, the line data for L [406] is written to the buffer BM-4, the line data for L [541] is written to the buffer BM-5, the line data for L [676] is written to the buffer BM-6, the line data for L [811] is written to the buffer BM-7, and the line data for L [946] is written to the buffer BM-8.

In addition, during the read period of the line data for L [136] from the buffer BM-2, the line data for L [271] is written to the buffer BM-3, the line data for L [406] is written to the buffer BM-4, the line data for L [541] is written to the buffer BM-5, the line data for L [676] is written to the buffer BM-6, the line data for L [811] is written to the buffer BM-7, the line data for L [946] is written to the buffer BM-8, and then line data for L [2] is written to the buffer BM-1.

In this way, the sorter 32 sorts the line data to the first through eighth relays RX-1 through RX-8 such that the line data is written to all the remaining buffers BM-mod (i+1, 8) through BM-mod (i+7, 8) during the read period of the line data from a certain buffer BM-i.

According to the above-described embodiment, the following effects can be obtained.

(1) The transmission rate of the video data through the transmission cable 21 connected to the i-th module M-i can be lowered below the transmission rate of the video data through the transmission cable 33 connecting the sorter 32 and the relay group 20 by the memory reader MR-i reading the video data from the buffer BM-i at a speed lower than the writing speed by the memory writer MW-i.

Specifically, as illustrated in FIG. 6, a time length of the video data reading period by the memory reader MR-i is equal to seven times the time length of the writing period by the memory writer MW-i. Therefore, the i-th relay RX-i can reduce the transmission rate of the video data directed to the i-th module M-i to 1/7 in relation to the reading.

(2) The reading of the line data from the certain buffer BM-i is performed during the writing period of the line data to all the remaining buffers BM-mod (i+1, 8) through BM-mod (i+7, 8). An occurrence of a period can be avoided during which it is necessary to interrupt the writing to the buffers BM-1 through BM-8 and wait for the completion of reading from the certain buffer BM-i.

That is, in spite of the transmission rate of the video data being reduced to 1/7 in relation to the reading in the relay group 20, without causing any overflow in any of the buffers BM-i, the line data sorting to the relay group 20 by the sorter 32 can be sequentially performed without interruption. Therefore, the frame rate can be maintained that matches the transmission rate of the video data from the sorter 32 to the relay group 20. The frame rate is 60 [fps].

(3) It is sufficient for the buffer BM-i to have enough storage capacity to store the line data for one line. Thus, an increase in the size of the configuration can be suppressed. More specifically, the buffer BM-i having a storage capacity for one line can be mounted in a Field Programmable Gate Array (FPGA) or an Application Specific Integrated Circuit (ASIC), and the i-th relay RX-i functions other than the transmission cable 21 can be achieved by a single integrated circuit chip.

In the present embodiment, there are eight relays in the relay group 20 and eight modules constituting the display 10, but the number for each is not limited to eight in particular. In Embodiment 1, assuming that the number of relays constituting the relay group 20 is L (L is a natural number of 3 or more), each relay can reduce the transmission rate of the video data to 1/(L-1).

Embodiment 2

In the configuration of Embodiment 1, the buffer BM-i may be formed of a plurality of independent partial buffers. In this case, the certain line data sorted to the i-th relay RX-i is written to one partial buffer included in the buffer BM-i, and then the line data sorted to the i-th relay RX-i can be written to other partial buffers included in the buffer BM-i.

This can reduce the reading speed of the video data from one partial buffer included in the buffer BM-i by using the writing period to the other partial buffers included in the buffer BM-i. Therefore, a further reduction in the transmission rate can be achieved. That is, each relay can reduce the transmission rate of the video data to less than 1/(L-1). A specific example is described below.

Figure 7:
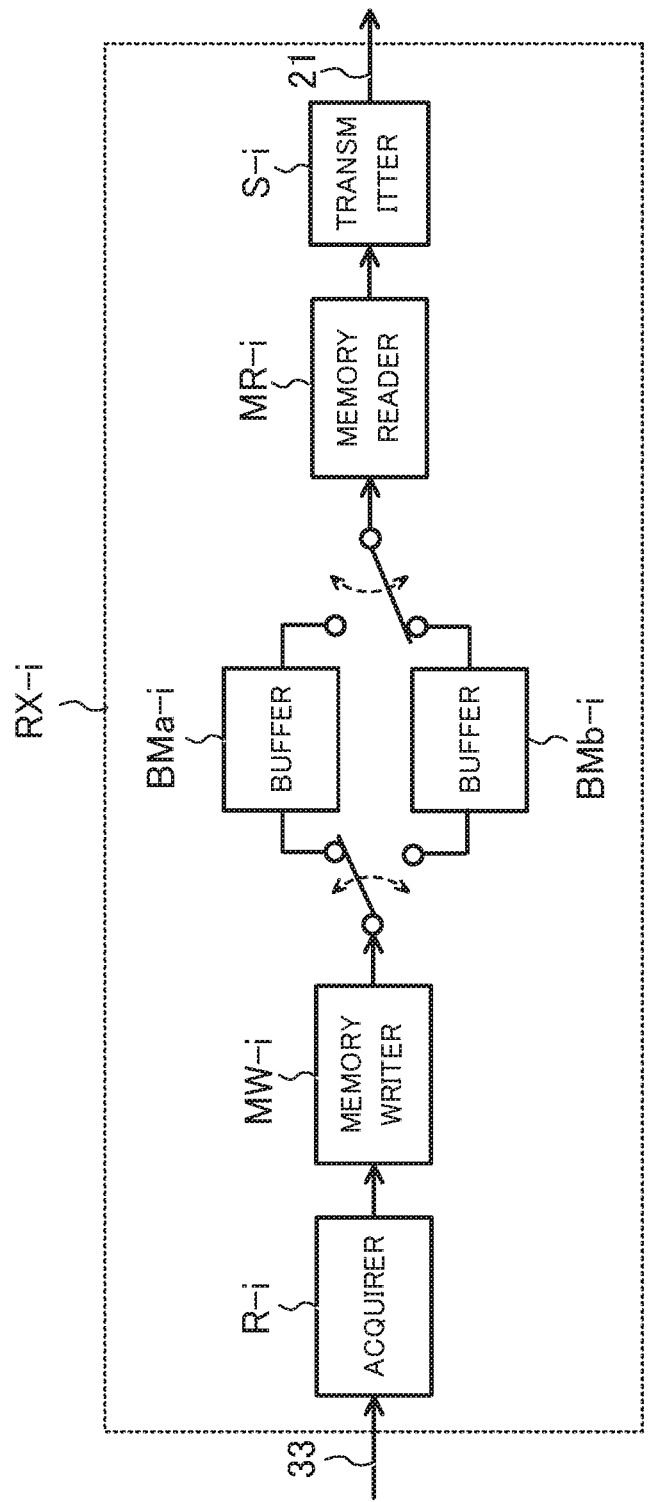
FIG. 7 is a block diagram illustrating a configuration of a relay according to Embodiment 2.

As illustrated in FIG. 7, in the present embodiment, the i-th relay RX-i includes independent partial buffers BMa-i and BMb-i. Besides this, the other configuration is similar to that of Embodiment 1.

The memory writer MW-i switches the writing destination each time the line data is provided to the acquirer R-i through the transmission cable 33. That is, after the memory writer MW-i writes a certain line data into one of the partial buffers BMa-i and BMb-i, the memory writer MW-i writes the next line data to the other partial buffer.

Among the buffers BMa-i and BMb-i, the memory reader MR-i begins by reading from the one written first by the memory writer MW-i.

Figure 8:
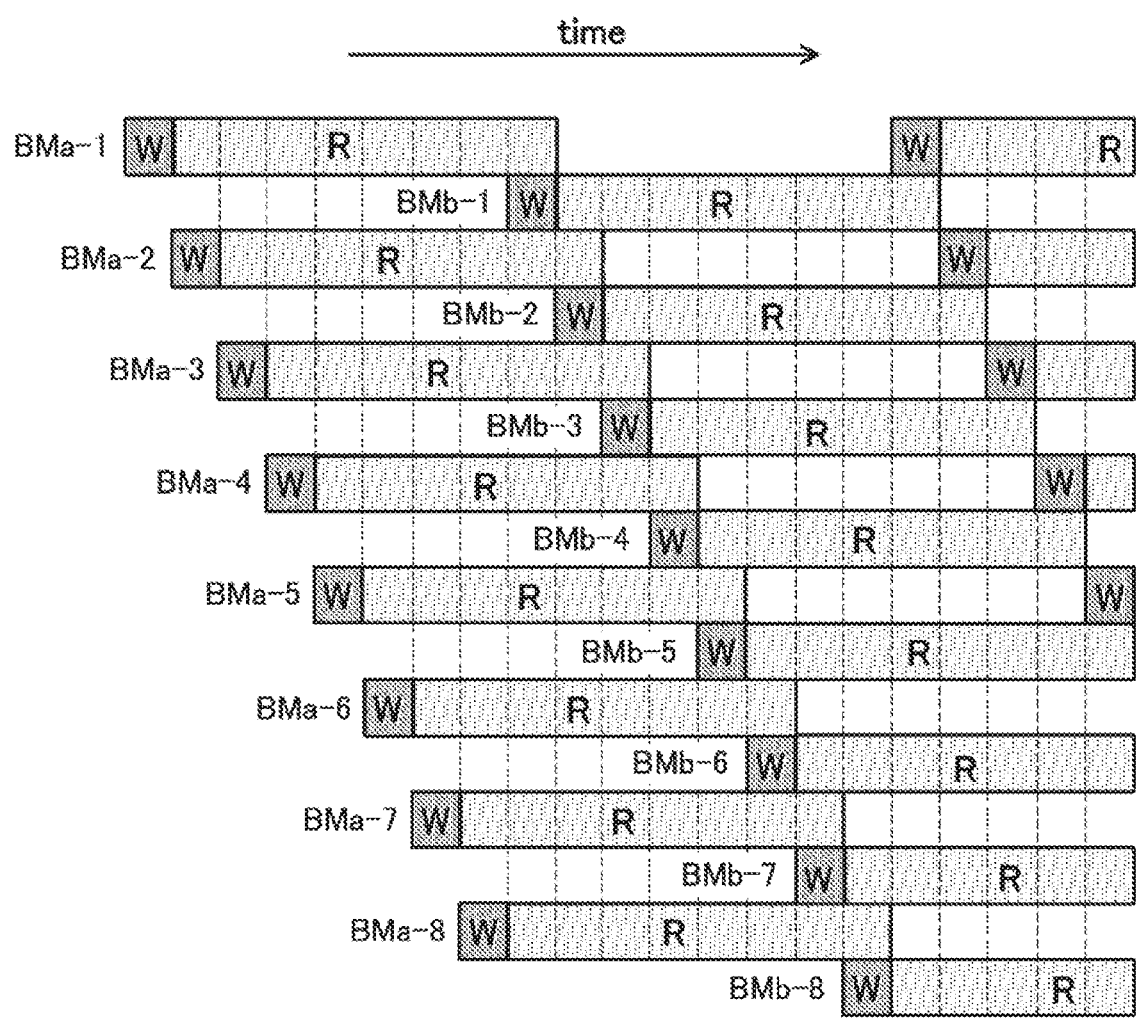
FIG. 8 is a timing chart of an operation of a memory writer and a memory reader according to Embodiment 2.

As illustrated in FIG. 8, according to the present embodiment, in the i-th relay RX-i, the writing period of one of the partial buffers BMa-i and BMb-i can be overlapped with the read period from the other partial buffer.

Therefore, as a read period of the video data by the memory reader MR-i, a period eight times the writing period by the memory writer MW-i can be secured. That is, the i-th relay RX-i can reduce the transmission rate of the video data to the i-th module M-i to 1/8 of the original transmission rate.

In general, in the case where the i-th relay RX-i has two partial buffers BMa-i and BMb-i as in the present embodiment, when the number of relays constituting the relay group 20 is assumed to be L, each relay can reduce the transmission rate of the video data to 1/L of the original transmission rate.

Embodiment 3

In Embodiment 2, the sorter 32 switches the sorting destination within the relay group 20 for each single line of line data. However, when the i-th relay RX-i includes a plurality of partial buffers, the sorter 32 may switch the sorting destination on a multi-line line data basis. A specific example is described below.

Figure 9:
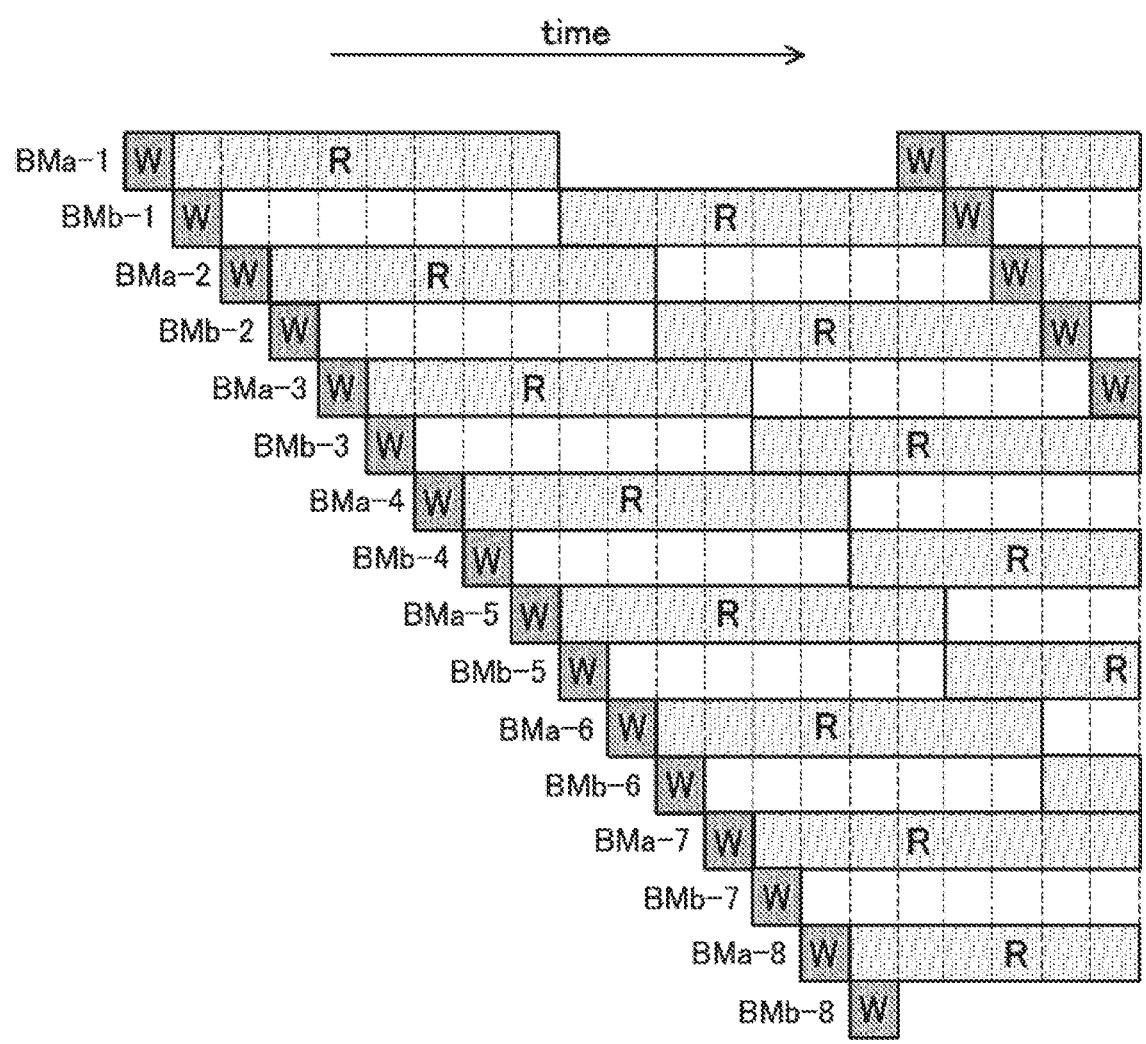
FIG. 9 is a timing chart of an operation of a memory writer and a memory reader according to Embodiment 3.

As illustrated in FIG. 9, in the present embodiment, after the sorter 32 transmits to the first relay RX-1 the line data for L [1] to be written in the partial buffer BMa-1 and the line data for L [2] to be written in the partial buffer BMb-1 in this order, the sorter 32 transmits to the second relay RX-2 the line data for L [136] to be written in the partial buffer BMa-2 and line data for L [137] to be written in the partial buffer BMb-2 in this order.

In this way, after the sorter 32 transmits to the i-th relay RX-i line data for L [x] to be written in the partial buffer BMa-i and line data for L [x+1] to be written in the partial buffer BMb-i, the sorter 32 switches the sorting destinations every two lines of line data in such a way that the sorter 32 transmits to mod (i+1, 8)-th relay RX-mod (i+1, 8) line data for L [y] to be written in the partial buffer BMa-mod (i+1, 8) and line data for L [y+1] to be written in the partial buffer BMb-mod (i+1, 8) in this order.

According to the present embodiment, it is sufficient for the sorter 32 to switch the sorting destinations every two lines of line data. Thus, effects of reducing the speed of the sorting operation by the sorter 32 can be obtained as compared with the case in which the sorting destinations are switched every line of line data.

Embodiment 4

In Embodiment 1, the sorter 32 sorts the line data for one line to the relay group 20 as the division data. The division data sorted by the sorter 32 may be video data of less than one line. A specific example is described below.

Figure 10:
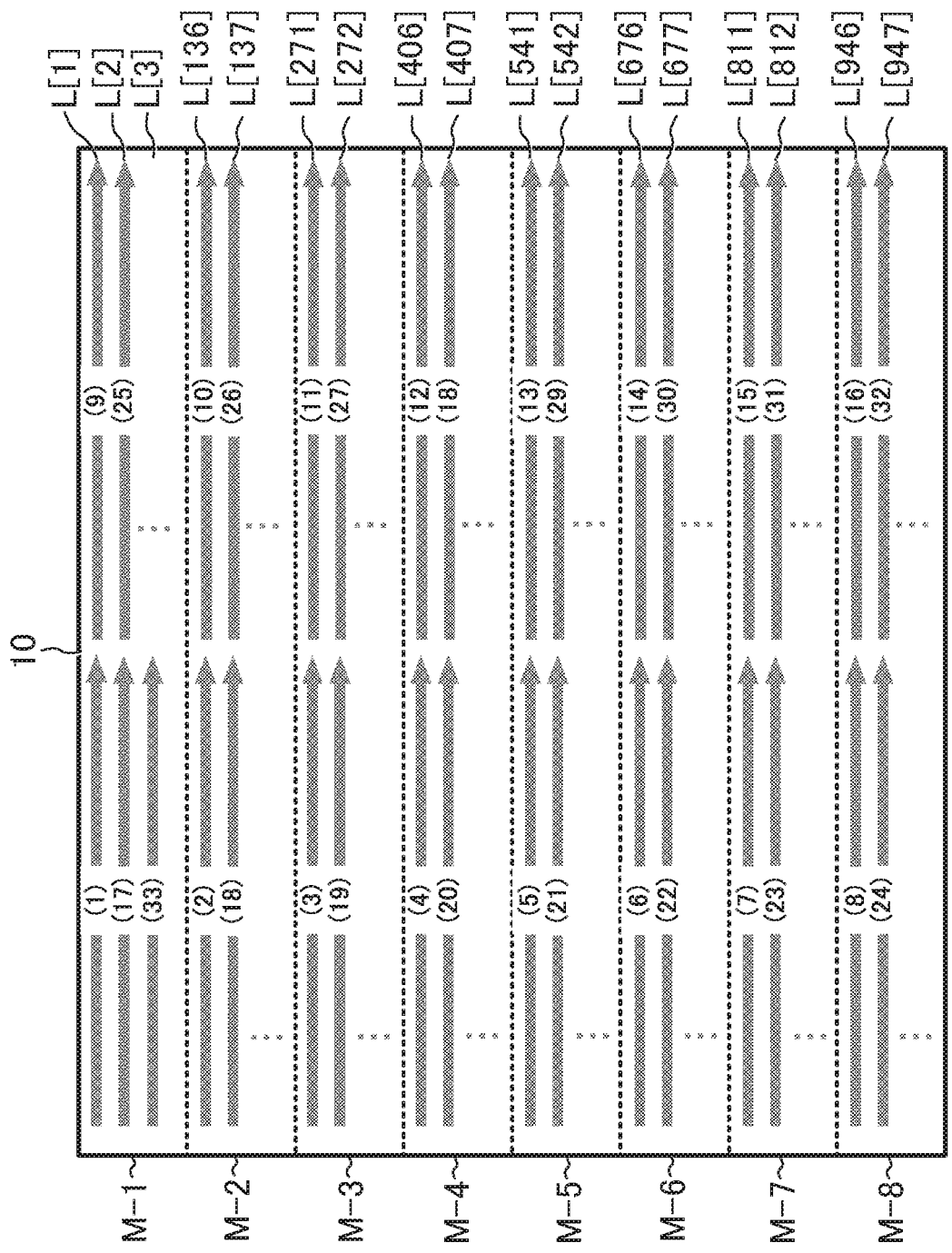
FIG. 10 is a conceptual diagram illustrating an order of ½ line data sorting according to Embodiment 4.

As illustrated in FIG. 10, in the present embodiment, the sorter 32 sorts ½ line data for ½ line as division data. Specifically, the sorter 32 sorts the ½ line data in order to achieve inputs of the ½ line data, in the order of the numbers (1), (2), (3) through (33) and beyond, to the display 10. That is, the ½-line data is sequentially and periodically provided to the first through eighth relays RX-1 through RX-8. The ½ line data is provided to the i-th relay RX-i in the order of the left half to the right half of one line in the lateral direction and in the order of the line numbers in the longitudinal direction.

According to the present embodiment, it is sufficient for the buffer BM-i to have a storage capacity capable of storing the video data of ½ line. Thus, the size of the configuration of the i-th relay RX-i is smaller than that achievable in the case of Embodiment 1.

Embodiment 5

In each of the above-described embodiments, the display 10 has a longitudinally divided structure as viewed from the front. The display 10 may have a laterally divided structure as viewed from the front. A specific example thereof is described below.

Figure 11:
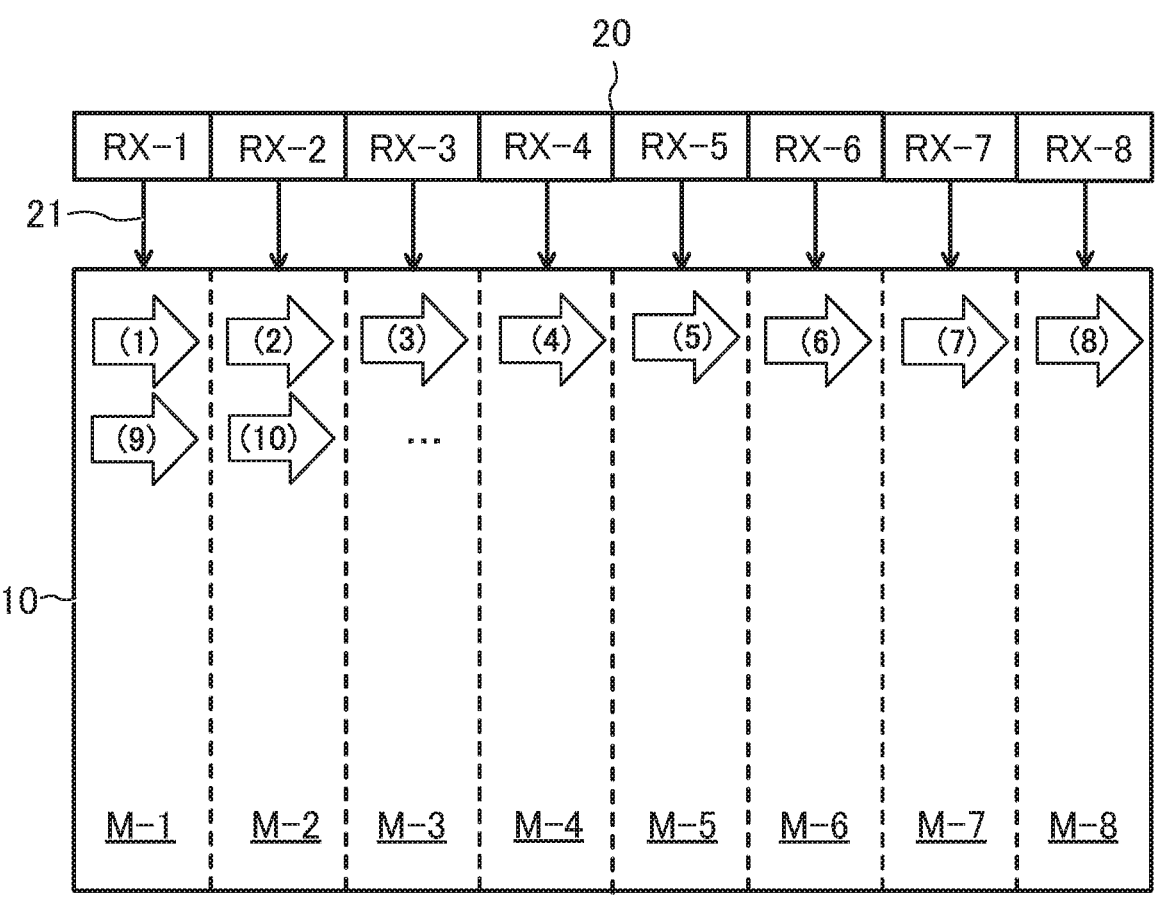
FIG. 11 is a conceptual diagram illustrating an order of ⅛ line data sorting according to Embodiment 5.

As illustrated in FIG. 11, in the present embodiment, the display 10 has a structure in which the first through eighth modules M-1 through M-8 which are long in the longitudinal direction as viewed from the front are coupled in the lateral direction.

The sorter 32 sorts the ⅛ line data in such a way that the ⅛ line data for ⅛ line as division data is input into the display 10 in order of the numbers (1), (2), (3) and beyond. Each ⅛ line data is sequentially and periodically provided to the first through eighth relays RX-1 through RX-8. The ⅛ line data is sequentially provided to the i-th relay RX-i in accordance with the line number in the longitudinal direction.

According to the present embodiment, it is sufficient for the buffer BM-i to have a storage capacity capable of storing the video data of ⅛ line. Thus, the size of the i-th relay RX-i can be further decreased.

However, from the viewpoint of simplifying the configuration of the i-th module M-i, the display 10 that is long in the lateral direction preferably has a structure that is divided in the longitudinal direction as illustrated in FIG. 1. This is because, in the case of the configuration illustrated in FIG. 11, the i-th module M-i is required to have a structure in which the display unit 11 illustrated in FIG. 2 is coupled both in the longitudinal direction and in the lateral direction. On the other hand, in the case of the configuration illustrated in FIG. 1, the i-th module M-i only has to have a structure in which the display unit 11 illustrated in FIG. 2 is coupled only in the lateral direction.

In addition, the display unit 11 illustrated in FIG. 2 is formed in a square shape as viewed from the front. In the case where one side is a unit of division, as the display 10 is long in the lateral direction, in the case of dividing the display 10 in the longitudinal direction, it is sufficient to divide the display 10 into eight portions as illustrated in FIG. 1, whereas when the display 10 is divided in the lateral direction, the display 10 is required to be divided into a large number of portions, specifically thirty (30) portions (=1920/64). Therefore, thirty transmission cables 21 are required. For this reason as well, the display 10 preferably has a structure divided in the longitudinal direction.

Embodiment 6

In each of the above embodiments, the configuration is adopted in which the video data is transmitted to the i-th module M-i as soon as the video data is read by the memory reader MR-i. The second buffer SM-i is interposed between the memory reader MR-i and the transmitter S-i, and the timing of the transmission of the video data from the i-th relay RX-i to the i-th module M-i may be adjusted. A specific example is described below.

Figure 12:
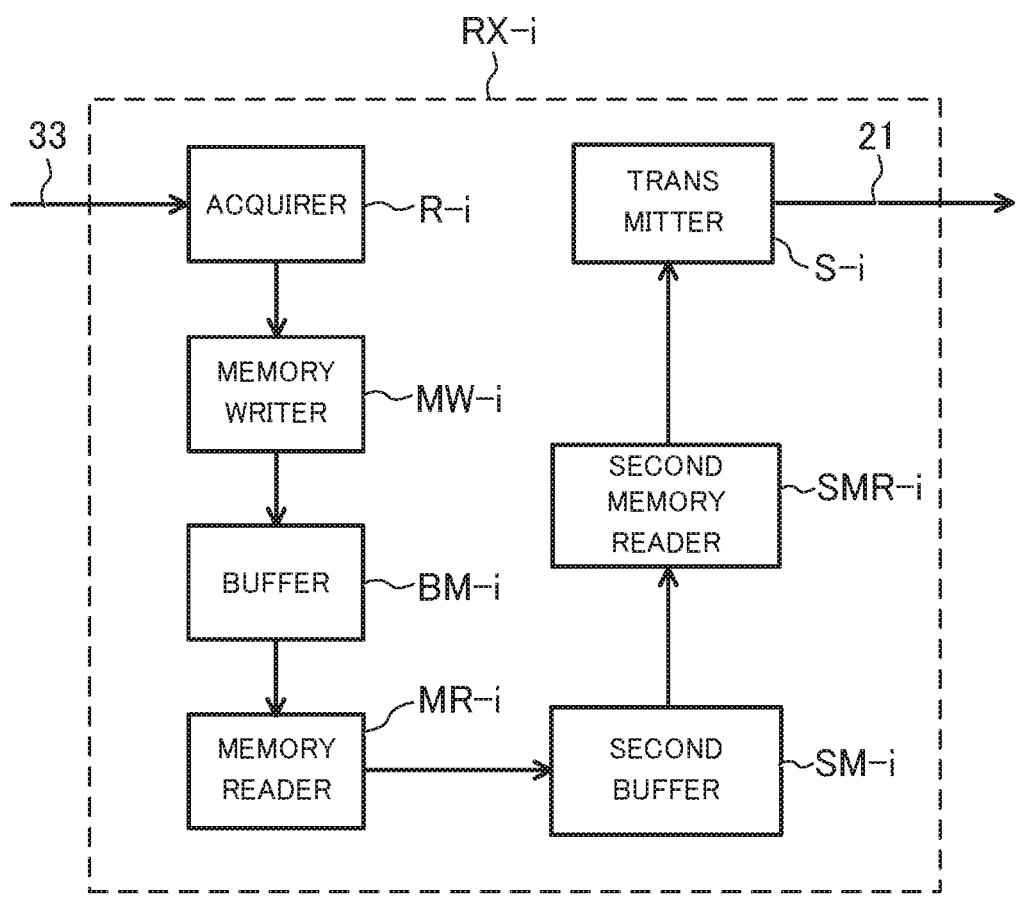
FIG. 12 is a block diagram illustrating a configuration of a relay according to Embodiment 6.

As illustrated in FIG. 12, in the present embodiment, between the memory reader MR-i and the transmitter S-i, the i-th relay RX-i further includes:

a second buffer SM-i for temporarily storing the video data output by the memory reader MR-i; and a second reader SMR-i that reads the video data from the second buffer SM-i at a speed equal to the reading speed by the memory reader MR-i and outputs the video data to the transmitter S-i.

According to the present embodiment, the timing of the transmission of the video data from the i-th relay RX-i to the i-th module M-i can be flexibly adjusted, and the timing of the transmission of the video data from the first through eighth relays RX-1 through RX-8 to the display 10 can be matched with the timing of the transmission of the video data from the i-th relay RX-i to the i-th module M-i.

Embodiments of the present disclosure are described above. The present disclosure is not limited to this, and the following modifications are also possible.

(i) FIG. 1 schematically shows how the sorter 32 switches the transmission cable 33 to facilitate understanding. The division data can be sorted without switching the transmission cable 33. That is, there is no need to provide eight transmission cables 33 connecting the sorter 32 and each of the acquirers R-1 to R-8 of the first through eighth relays. A series transmission cable may be provided that connects the sorter 32 and the acquirers R-1 to R-8 of the first through eighth relay in series. It is sufficient for the sorter 32 to send to serial transmission cable each division data to which a piece of address data for identifying the relay as a destination, and for each relay to simply acquire division data to which the relay's own address information is attached.

(ii) In each of the above embodiments, the display area 10*a* of the display 10 includes 1080 pixels in height×1920 pixels in width. However, the number of pixels in the display area 10*a* is not particularly limited. The number of pixels of the display area 10*a* may be, for example, 1024 pixels in height×1280 pixels in width or 480 pixels in height and 640 pixels in width.

(Iii) In the video display device 100 according to each of the above embodiments, (a) the functions of the sorter 32 and the memory writer MW-i that sequentially write the video data into the eight buffers BM-1 through BM-8 per division data for less than one module within one frame, and (b) the functions of the memory reader MR-i that reads the division data from the buffer BM-i in which the division data are written to all the other buffers BM-mod (i+1, 8) through BM-mod (i+7, 8) at a slower speed than the writing speed of the division data by using the writing period can be achieved by a computer executable program.

The functions of the sorter 32, the memory writer MW-i, and the memory reader MR-i can be achieved by installing such a program in the computer. Distribution of the program is optional and may be distributed via a communication network or may be stored in a computer-readable recording medium such as a compact disc read-only memory (CD-ROM), a digital versatile Disc (DVD), a magneto optical disk (MO), a memory card, and the like, and distributed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2016-022955, filed on Feb. 9, 2016, the entire disclosure of which is incorporated by reference herein.

INDUSTRIAL APPLICABILITY

The video display device according to the present disclosure can be used by being installed in a sports facility such as a stadium, a baseball venue, and a soccer venue, amusement venue such as a horse racetrack, a boat racing venue, a wall of a building or the like.

REFERENCE SIGNS LIST

10 Display
10a Display area
11 Display unit
12 Light emitting element
20 Relay group
21 Transmission cable
30 Video data supplier
31 Memory
32 Sorter
33 Transmission cable
100 Video display device
M-1 through M-8 First through eighth module
RX-1 through RX-8 First through eighth relay
R-1 through R-8 Acquirer
MW-1 through MW-8 Memory writer
BM-1 through BM-8 Buffer
BMa-1 through BMa-8 Partial buffer
BMb-1 through BMb-8 Partial buffer
MR-1 through MR-9 Memory reader
SM-1 through SM-8 Second buffer
SMR-1 Second memory reader
SMR-2 Second memory reader
S-1 through S-8 Transmitter

The invention claimed is:

1. A video display device, comprising:
a display comprising at least three modules, each of the modules displaying an image corresponding to video data input from an outside of the video display device;
a relay group disposed on a transmission path of the video data leading to the display, the relay group causing reduction in a transmission rate of the video data; and
a video data supplier to supply the video data to the relay group,
wherein
the relay group comprises at least three relays that are provided for the respective modules,
each of the relays comprises
a plurality of partial buffers to store the video data,
a memory writer to write, to each of the partial buffers, division data that is the video data for less than one module within one frame, supplied from the video data supplier and to switch, every time the division data is provided from the video data supplier, a partial buffer on which writing is performed among the partial buffers, and
a memory reader that, after the memory writer completes the writing, reads the division data from the partial buffer at a speed lower than a speed of the writing and outputs the read division data to the corresponding module, and has a reading period for reading the division data from one partial buffer of the partial buffers, the reading period having an overlap with a writing period for writing the division data to another partial buffer of the partial buffers, and
the video data supplier sequentially sorts the video data into the relays on a multi-division data basis such that reading of the division data from the partial buffer in one relay of the relays is performed during a writing period for writing the division data to the partial buffers of each of remaining relays of the relays.

2. The video display device according to claim 1, wherein each of the relays includes a transmission cable through which the division data output by the memory reader is transmitted to the corresponding module, and
the display includes a display area having a shape whose longitudinal direction is one direction as viewed from in front of the display, and has a structure in which the modules are coupled together in a traverse direction that is orthogonal to the longitudinal direction.

3. The video display device according to claim 1, wherein the division data is the video data of one line or less within one frame.

4. The video display device according to claim 1, wherein each of the relays reduces a transmission rate of the video data to $1/(L-1)$ or less where the number of the relays that constitute the relay group is L.

5. The video display device according to claim 1, wherein each of the relays further comprises a second buffer to temporarily store the division data output by the memory reader.

6. A method for transmitting video data, the method comprising:
sequentially sorting the video data into at least three relays provided to respective at least three modules, the modules forming one common display, each of the modules displaying an image corresponding to the video data input from an outside and writing the video data to a plurality of partial buffers provided to the respective relays; and reading division data from a partial buffer of the partial buffers to which the division data is written at a speed lower than a speed of writing the division data by performing the reading during a writing period for writing the division data to each of remaining partial buffers of the partial buffers, and transmitting the read division data to the corresponding module, wherein in the writing of the video data, switching of a sorting destination of the video data from the one relay to the remaining relays is performed on a multi-division data basis.

\* \* \* \* \*